(12) United States Patent
Da et al.

(10) Patent No.: US 6,459,405 B1
(45) Date of Patent: Oct. 1, 2002

(54) SATELLITE-BASED LOCATION SYSTEM EMPLOYING KNOWLEDGE-BASED SEQUENTIAL SIGNAL SEARCH STRATEGY

(75) Inventors: Ren Da, Morris Township, Morris County, NJ (US); Giovanni Vannucci, Middletown Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/392,765

(22) Filed: Sep. 7, 1999

(51) Int. Cl.[7] .............................. G01S 5/02; H04B 7/185
(52) U.S. Cl. .................................................. 342/357.09
(58) Field of Search ..................... 342/357.09, 357.02, 342/357.1, 357.01–357.17

(56) References Cited

U.S. PATENT DOCUMENTS

| | | | | |
|---|---|---|---|---|
| 5,185,761 A | * | 2/1993 | Kawasaki ................... 342/352 |
| 5,874,914 A | * | 2/1999 | Krasner ................... 342/357.12 |
| 6,081,229 A | * | 6/2000 | Soliman et al. ........ 342/357.05 |
| 6,114,992 A | * | 9/2000 | Undebrink ............. 342/357.15 |

\* cited by examiner

Primary Examiner—Thomas H. Tarcza
Assistant Examiner—Fred H Mull
(74) Attorney, Agent, or Firm—Jimmy Goo (57) ABSTRACT

Disclosed is a method and apparatus for facilitating detection of satellite signals using a sequential search technique. The sequential search technique is a knowledge based technique that sequentially searches for satellite signals based on search messages and information accumulated during prior searches to effectively reduce the area and code phase search range in which a GPS receiver searches for the satellite signals, thereby enhancing detection of the satellite signals.

28 Claims, 5 Drawing Sheets

SATELLITE-BASED LOCATION SYSTEM EMPLOYING KNOWLEDGE-BASED SEQUENTIAL SIGNAL SEARCH STRATEGY

RELATED APPLICATIONS

Related subject matter is disclosed in the following applications and assigned to the same Assignee hereof: U.S. patent application Ser. No. 08/927,434 entitled "An Auxiliary System For Assisting A Wireless Terminal In Determining Its Position From Signals Transmitted From A Navigation Satellite," inventors Robert Ellis Richton and Giovanni Vannucci; U.S. patent application Ser. No. 08/927, 432 entitled "Telecommunications Assisted Satellite Positioning System," inventors Giovanni Vannucci; U.S. patent application Ser. No. 09/321,075 entitled "Wireless Assisted GPS Using A Reference Location," inventors Robert Ellis Richton and Giovanni Vannucci; and U.S. patent application Ser. No. 60/114,491 entitled "Wireless Assisted Satellite Location Using a Reference Point," inventors Robert Ellis Richton and Giovanni Vannucci. Related subject matter is disclosed in the following application filed concurrently herewith and assigned to the same Assignee hereof: U.S. patent application entitled "Satellite-Based Location System Employing Dynamic Integration Techniques", Ser. No. 09/391,123.

FIELD OF THE INVENTION

The present invention relates generally to wireless communication systems and, in particular, to satellite-based location systems.

BACKGROUND OF THE RELATED ART

Satellite-based navigational systems provide accurate, three dimensional position information to worldwide users. Prior art satellite-based navigational systems, however, utilize a time consuming search process for determining position information. Time consuming search processes are undesirable in navigational systems particularly when the user is moving or in an emergency situation requiring immediate assistance.

Figure 1:
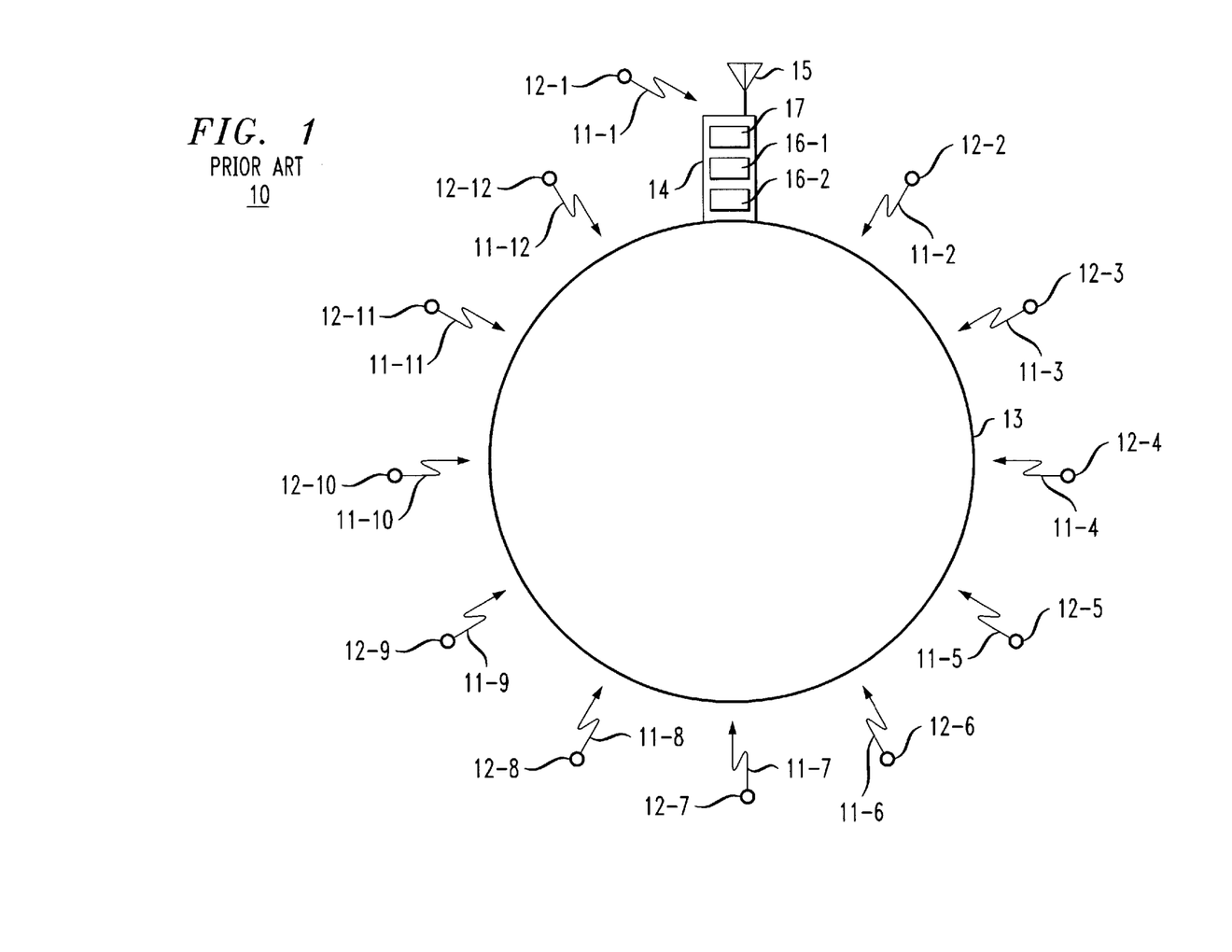
FIG. 1 depicts a well-known satellite-based navigational system referred to as Global Positioning System (GPS)
Figure 2:
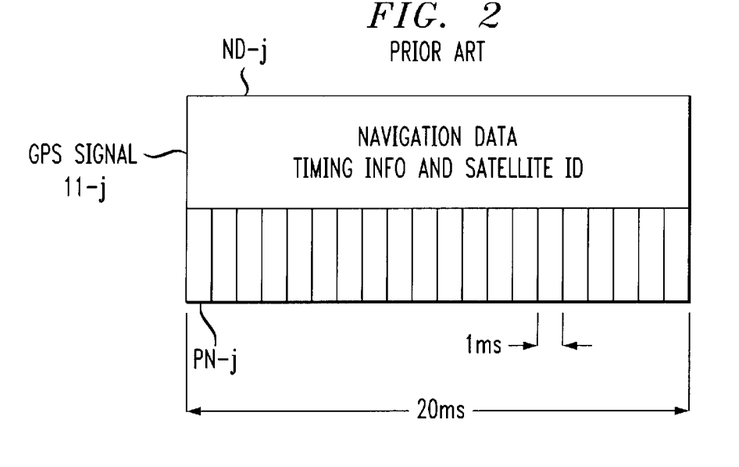
FIG. 2 depicts a typical 20 ms frame of a GPS signal.

FIG. 1 depicts a well-known satellite-based navigational system referred to as Global Positioning System (GPS) 10. GPS 10 comprises a plurality of satellites 12-j and at least one GPS receiver 14, where j=1,2, . . . ,n. Each satellite 12-j orbiting earth at a known speed $v_j$ and being a known distance apart from the other satellites 12-j. Each satellite 12-j transmits a GPS signal 11-j which includes a carrier signal with a known frequency f modulated using a unique pseudo-random noise (PN-j) code and navigational data (ND-j) associated with the particular satellite 12-j, wherein the PN-j code includes a unique sequence of PN chips and navigation data ND-j includes a satellite identifier, timing information and orbital data, such as elevation angle $\alpha_j$ and azimuth angle $\phi_j$. FIG. 2 depicts a typical 20 ms frame of the GPS signal 11-j which comprises twenty full sequences of a PN-j code in addition to a sequence of navigation data ND-j.

GPS receiver 14 comprises an antenna 15 for receiving GPS signals 11-j, a plurality of correlators 16-k for detecting GPS signals 11-j and a processor 17 having software for determining a position using the navigation data ND-j, where k=1,2, . . . ,m. GPS receiver 14 detects GPS signals 11-j via PN-j codes. Detecting GPS signals 12-j involves a correlation process wherein correlators 16-k are used to search for PN-j codes in a carrier frequency dimension and a code phase dimension. Such correlation process is implemented as a real-time multiplication of a phase shifted replicated PN-j codes modulated onto a replicated carrier signal with the received GPS signals 11-j, followed by an integration and dump process.

In the carrier frequency dimension, GPS receiver 14 replicates carrier signals to match the frequencies of the GPS signals 11-j as they arrive at GPS receiver 14. However, due to the Doppler effect, the frequency f at which GPS signals 11-j are transmitted changes an unknown amount $\Delta f_j$ before GPS signal 11-j arrives at GPS receiver 14— that is, each GPS signal 11-j should have a frequency $f+\Delta f_j$ when it arrives at GPS receiver 14. To account for the Doppler effect, GPS receiver 14 replicates the carrier signals across a frequency spectrums $f_{spec}$ ranging from $f+\Delta f_{min}$ to $f+\Delta f_{max}$ until the frequency of the replicated carrier signal matches the frequency of the received GPS signal 11-j, wherein $\Delta f_{min}$ and $\Delta f_{max}$ are a minimum and maximum change in frequency GPS signals 11-j will undergo due to the Doppler effect as they travel from satellites 12-j to GPS receiver 14, i.e., $\Delta f_{min} \leq \Delta f_j \leq \Delta f_{max}$.

In the code phase dimension, GPS receiver 14 replicates the unique PN-j codes associated with each satellite 12-j. The phases of the replicated PN-j codes are shifted across code phase spectrums $R_j(spec)$ until replicated carrier signals modulated with the replicated PN-j codes correlate, if at all, with GPS signals 11-j being received by GPS receiver 14, wherein each code phase spectrum $R_j(spec)$ includes every possible phase shift for the associated PN-j code. When GPS signals 11-j are detected by correlators 16-k, GPS receiver 14 extracts the navigation data ND-j from the detected GPS signals 11-j and uses the navigation data ND-j to determine a location for GPS receiver 14, as is well-known in the art.

Correlators 16-k are configured to perform parallel searches for a plurality of PN-j codes across the frequency spectrum $f_{spec}$ and the code phase spectrums $R_j(spec)$. In other words, each of the plurality of correlators 16-k are dedicated to searching for a particular PN-j code across each possible frequency between $f+\Delta f_{min}$ to $f+\Delta f_{max}$ and each possible for that PN-j code. When a correlator 16-k completes its search for a PN-j code, the correlator 16-k searches for another PN-j code across each possible frequency between $f+\Delta f_{min}$ to $f+\Delta f_{max}$ and each possible phase shift for that PN-j code. This process continues until all PN-j codes are collectively searched for by the plurality of correlators 16-k. For example, suppose there are twelve satellites 12-j, thus there would be twelve unique PN-j codes. If GPS receiver 14 has six correlators 16-k, then GPS receiver 14 would use its correlators 16-k to search for two sets of six different PN-j codes at a time. Specifically, correlators 16-k search for the first six PN-j codes, i.e., correlator 16-1 searches for PN-1, correlator 16-2 searches for PN-2, etc. Upon completing the search for the first six PN-j codes, correlators 16-k search for the next six PN-j codes, i.e., correlator 16-1 searches for PN-7, correlator 16-2 searches for PN-8, etc.

For each PN-j code being searched, correlator 16-k performs an integration and dump process for each combination of frequency and phase shifts for that PN-j code. For example, suppose the frequency spectrum $f_{spec}$ includes 50 possible frequencies for the carrier signal and the code phase spectrum $R_j(spec)$ for a PN-j code includes 2,046 possible half-chip phase shifts. To search for every possible combination of frequency and half-chip phase shifts for the PN-j code, the correlator 16-k would then need to perform 102, 300 integrations. A typical integration time for correlators 16-k is 1 ms, which is generally sufficient for GPS receiver 14 to detect GPS signals 11-j when antenna 15 has a clear view of the sky or a direct line-of-sight to satellites 12-j. Thus, for the above example, 102.3 seconds would be required for one correlator 16-k to search every possible combination of frequency and half-chip phase shifts for a PN-j code.

GPS receivers, however, are now being incorporated into mobile-telephones or other types of mobile communication devices which do not always have a clear view of the sky. Thus, GPS receiver 14 will not always have a clear view of the sky. In this situation, the signal-to-noise ratios of GPS signals 11-j received by GPS receiver 14 are typically much lower than when GPS receiver 14 does have a clear view of the sky, thus making it more difficult for GPS receiver 14 to detect the GPS signals 11-j. To compensate for weaker signal-to-noise ratios and enhance detection of GPS signals 11-j, correlators 16-k can be configured with longer integration times. A sufficient integration time, in this case, would be approximately 1 second. Thus, for the example above, 102,300 seconds would be required for a correlator 16-k to search for every possible combination of frequency and half-chip phase shifts for a PN-j code. Longer integration times result in longer acquisition times for detecting GPS signals 11-j. Longer acquisition times are undesirable.

Wireless assisted GPS (WAG) systems were developed to facilitate detection of GPS signals 11-j by GPS receivers configured with short or long integration times. The WAG system facilitates detection of GPS signals 11-j by reducing the number of integrations to be performed by correlators searching for GPS signals 11-j. The number of integrations is reduced by narrowing the frequency range and code phase ranges to be searched. Specifically, the WAG system limits the search for GPS signals 11-j to a specific frequency or frequencies and to a range of code phases less than the code phase spectrum $R_j(spec)$.

Figure 3:
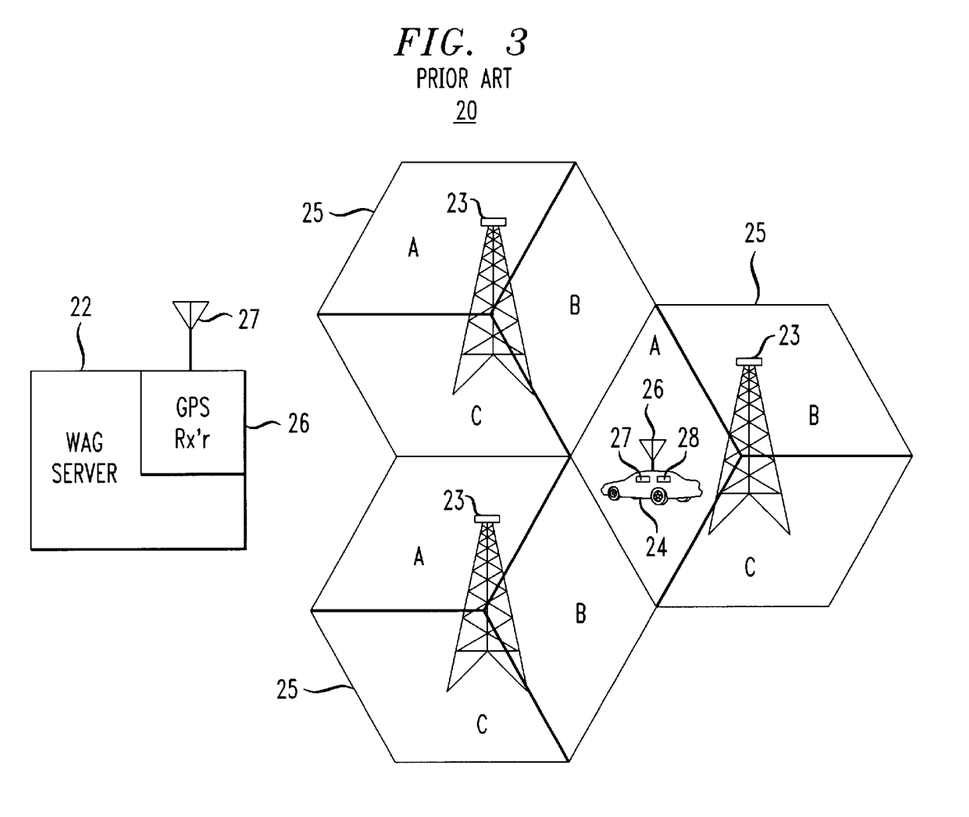
FIG. 3 depicts a Wireless Assisted GPS (WAG) system.

FIG. 3 depicts a WAG system 20 comprising a WAG server 22, a plurality of base stations 23 and at least one WAG client 24. WAG server 22 includes a GPS receiver 26 having an antenna 27 installed in a known stationary location with a clear view of the sky. GPS receiver 26 would typically have correlators configured with short integration times because antenna 27 has a clear view of the sky. WAG server 22 being operable to communicate with base stations 23 either via a wired or wireless interface. Each base station 23 has a known location and provides communication services to WAG clients located within a geographical area or cell 25 associated with the base station 23, wherein each cell 25 is a known size and is divided into a plurality of sectors. WAG client 24 includes a GPS receiver 28 and perhaps a mobile-telephone 27, and is typically in motion and/or in an unknown location with or without a clear view of the sky. GPS receiver 28 having correlators typically configured with long integration times. Note that the term "mobile-telephone," for purposes of this application, shall be construed to include, but is not limited to, any communication device.

Figure 4:
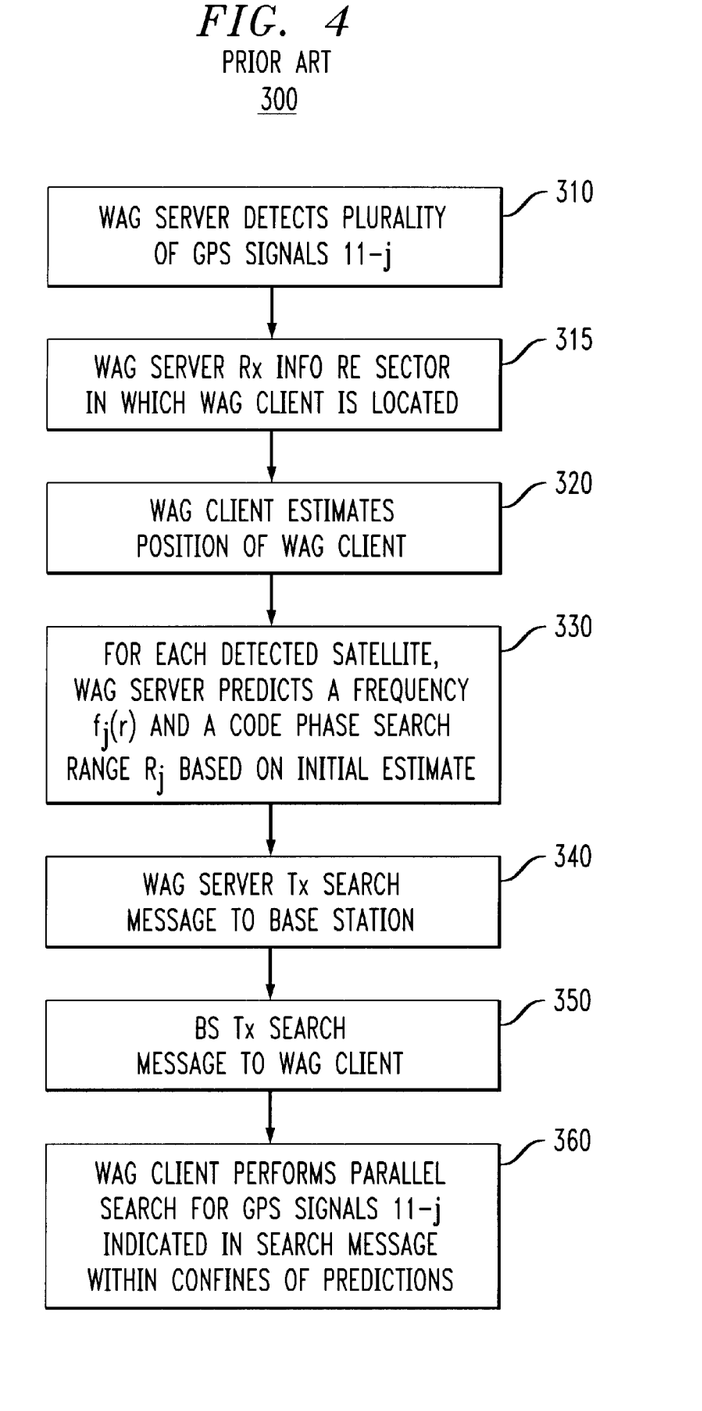
FIG. 4 depicts a flowchart illustrating the operation of the WAG system of FIG. 3.
Figure 5:
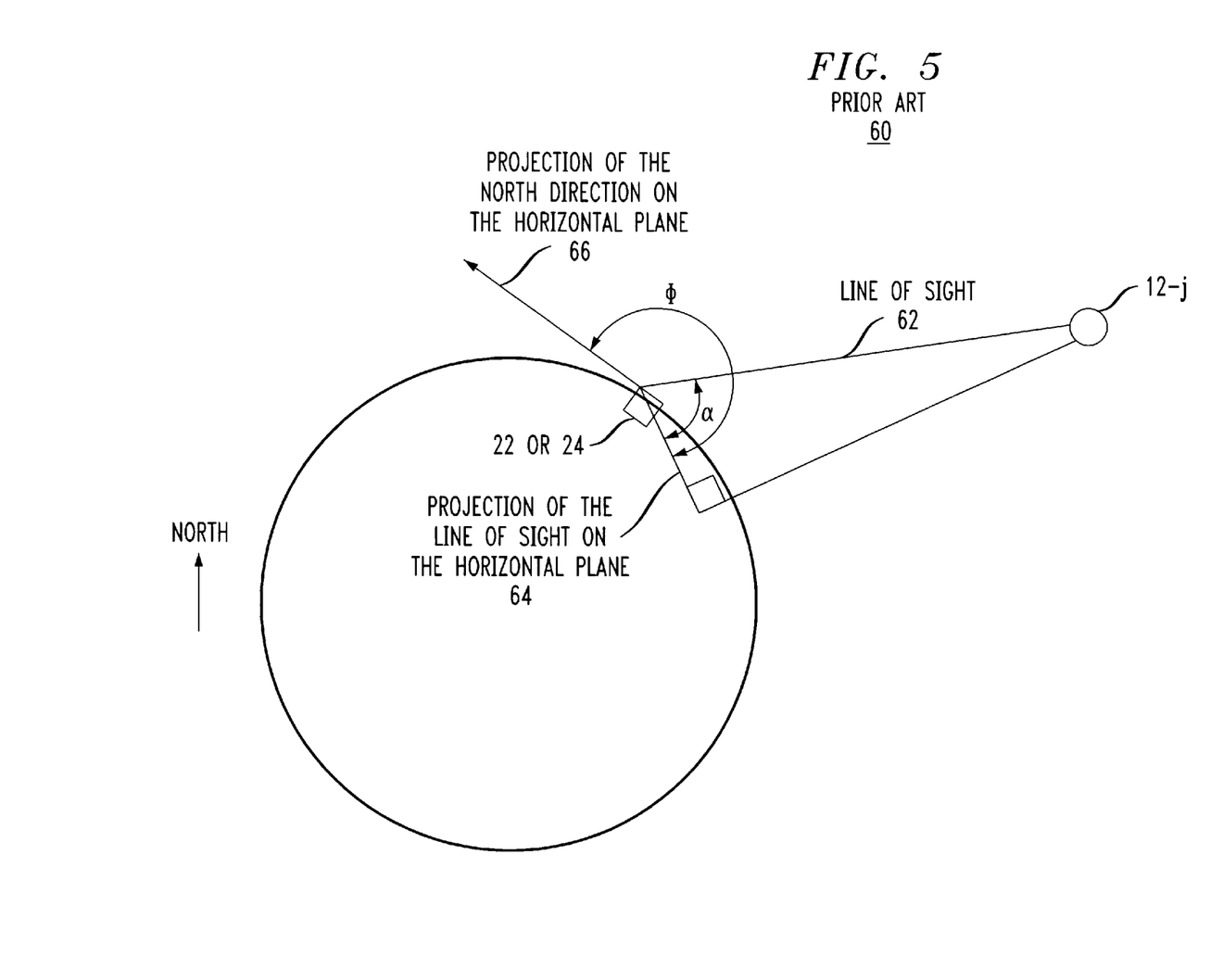
FIG. 5 depicts an elevation angle $\alpha_j$ and an azimuth angle $\phi_j$ corresponding to a satellite and a WAG server or WAG client.

FIG. 4 is a flowchart 300 illustrating the operation of WAG system 20. In step 310, WAG server 22 detects a plurality of satellites 12-j via their GPS signals 11-j using its GPS receiver 26. WAG server 22 acquires the following information from each detected satellite 12-j: the identity of satellite 12-j and frequency $f_j$, code phase, elevation angle $\alpha_j$ and azimuth angle $\phi_j$ associated with the detected satellite 12-j, wherein the elevation angle $\alpha_j$ is defined as the angle between the line of sight from WAG server 22 or client 24 to a satellite 12-j and a projection of the line of sight on the horizontal plane, and the azimuth angle $\phi_j$ is defined as the angle between the projection of the line of sight on the horizontal plane and a projection of the north direction on the horizontal plane. See FIG. 5, which depicts an elevation angle $\alpha_j$ and an azimuth angle $\phi_j$ corresponding to a satellite 12-j and a WAG server 22 or WAG client 24.

In step 315, WAG server 22 receives sector information from base station 23 currently in communication with or serving WAG client 24, wherein the sector information indicates a sector WAG client 24 is currently located. In step 320, WAG server 22 makes an initial estimate of WAG client's position based on the known location of the serving base station, the cell size associated with the serving base station, and the sector in which WAG client 24 is currently located. In one embodiment, WAG server 22 initially estimates that WAG client 24 is located at a reference point within the sector, e.g., point at approximate center of sector. In another embodiment, WAG server 22 initially estimates WAG client 24's position using well-known forward link triangulation techniques.

In step 330, for each detected satellite 12-j, WAG server 22 uses the information acquired from the detected GPS signals 11-j to predict a frequency $f_j(r)$ at the reference point and a code phase search range $R_j(sect)$ which includes all possible code phases for GPS signal 11-j arriving anywhere within the sector where WAG client 24 is currently located. In step 340, WAG server 22 transmits a search message to the serving base station 23, wherein the search message includes, for each detected satellite 12-j, information regarding the associated PN-j code, predicted frequency $f_j(r)$ and code phase search range $R_{j(sect)}$.

In step 350, serving base station 23 transmits the search message to WAG client 24 which, in step 360, begins a parallel search for the satellites 12-j indicated in the search message. Specifically, WAG client 24 will use its correlators to simultaneously search for each of the GPS signals 11-j at the predicted frequency $f_j(r)$ within the limitations of the code phase search range $R_j(sect)$ indicated in the search message. Thus, the number of integrations is reduced to the predicted frequency $f_j(r)$ within the limitations of the code phase search range $R_j(sect)$. However, due to the long integration times of GPS receiver 28 in WAG client 24, the search time is still considered time consuming. Accordingly, there exists a need to facilitate detection of satellites 12-j particularly when GPS receiver correlators are configured with longer integration times.

SUMMARY OF THE INVENTION

The present invention is a method and apparatus for facilitating detection of satellite signals using a sequential search technique. The present invention uses a sequential search technique to sequentially search for satellite signals based on information in a search message. Information accumulated during prior searches of satellite signals is then used, in conjunction with the information in the search message, to effectively reduce the area and code phase search ranges in which a GPS receiver searches for other satellite signals.

In one embodiment, the GPS receiver uses a plurality of its correlators to search for a first satellite indicated in a search message based on the one or more of the following criteria: maximize utilization of correlators; minimize search time; and maximize the amount of information regarding location of the GPS receiver. Subsequently, the GPS receiver uses its correlators to search for a second satellite indicated in the search message based information acquired upon detecting the first satellite and on one or more of the following criteria: maximize utilization of correlators; minimize search time; and maximize the amount of additional information regarding location of the GPS receiver when used in conjunction with the information obtained from a signal transmitted by the first satellite. Information acquired upon detecting the first and second satellites are used to predict an area in which the GPS receiver may be located. Such area is typically an area much smaller than the size of the sector in which the GPS receiver is currently located. Based on the predicted area, code phase search ranges $R_j(pred)$ are predicted for the remaining satellites indicated in the search message. Advantageously, the predicted code phase search ranges $R_j(pred)$ are narrower than code phase search ranges $R_j(sect)$ indicated in the search message. The GPS receiver uses the predicted code phase search ranges and frequencies indicated in the search message to perform a parallel search for two or more of the remaining satellites. Upon detecting some or all of the satellites indicated in the search message, a position of the GPS receiver can be estimated using navigation data in signals transmitted by the detected satellites.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is described herein with reference to the aforementioned WAG system. This should not be construed, however, to limit the present invention any manner.

Figure 6:
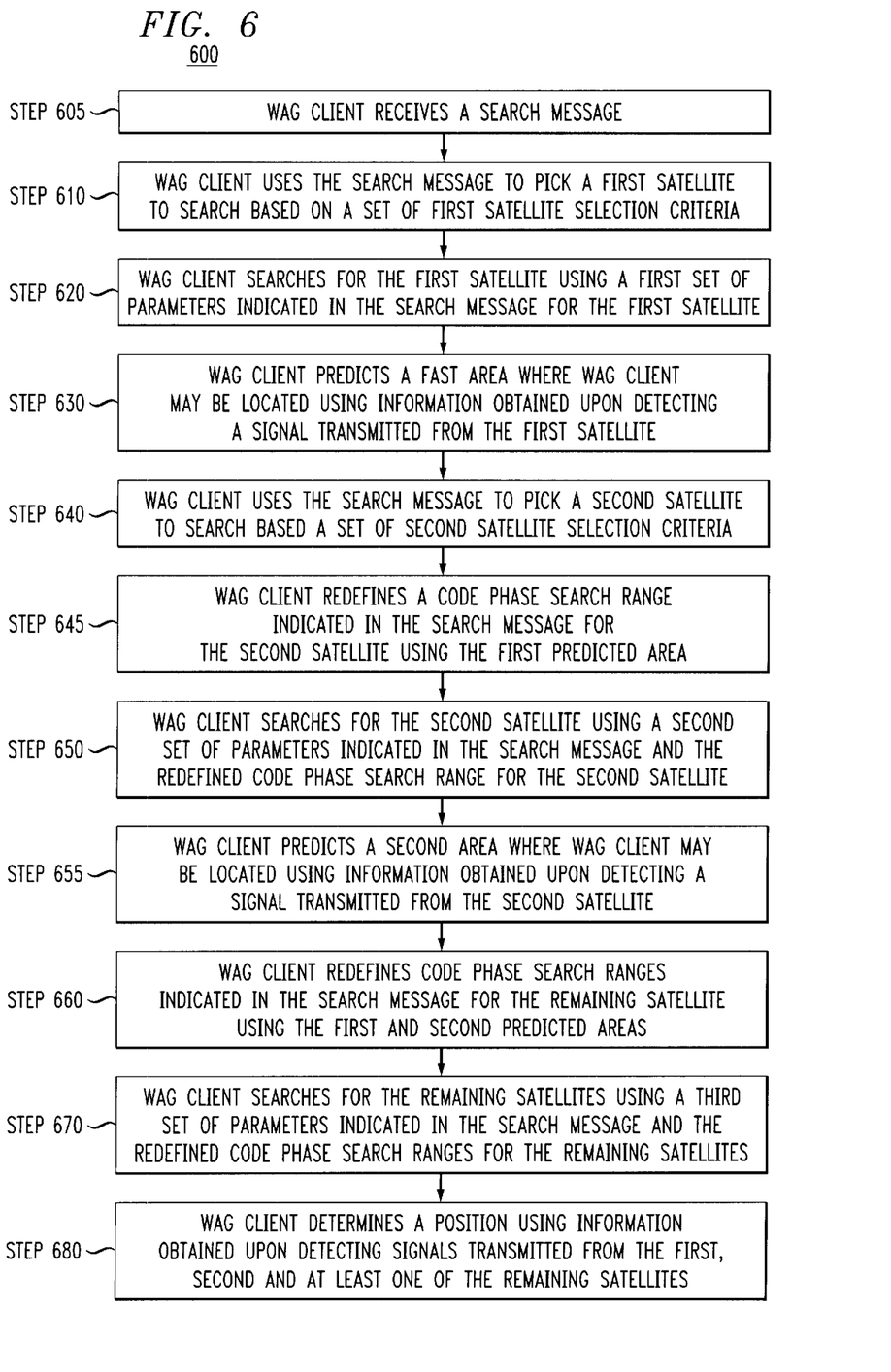
FIG. 6 is a flowchart illustrating a sequential search technique used in accordance with one embodiment of the present invention.

FIG. 6 is a flowchart 600 illustrating a sequential search technique use in accordance with one embodiment of the present invention. In step 605, WAG client 24 receives a search message from its serving base station 23 or WAG server 22. In the present invention, the search message includes, for each satellite 12-j detected by WAG server 22, information regarding the associated PN-j code, predicted frequency $f_j(r)$ at a reference point within the sector/cell where WAG client 24 is currently located, code phase search range $R_j(sect)$ including all possible phase shifts for a GPS signal 11-j transmitted by satellite 12-j and arriving within the sector/cell where WAG client 24 is currently located, and orbital data including elevation angle $\alpha_j$ and azimuth angle $\phi_j$.

In step 610, WAG client 24 selects a first satellite 12-j indicated search message to search. WAG client 24 uses one or more criteria in a set of first satellite selection criteria to select the first satellite 12-j. In one embodiment, the set of first satellite/selection criteria are as follows: (1) maximize utilization of correlators; (2) minimize search time; and (3) maximize the amount of information regarding location of WAG client 24 (or GPS receiver 14 or antenna 15). The first criteria of maximizing utilization of correlators involves using as many of the available correlators to simultaneously search for a satellite 12-j. The second criteria of minimizing search time involves reducing the number of integrations to be performed by each correlator, e.g., each correlator performs one integration. Reducing the number of integrations to be performed by each correlator essentially means selecting a satellite 12-j having the smallest associated code phase search range R, indicated in the search message.

The third criteria of maximizing the amount of information regarding the location of WAG client 24 involves selecting a satellite 12-j that, when detected will indicate an area in the sector where WAG client 24 is located. For example, a satellite 12-j with a small elevation angle $\alpha_j$, when detected, will indicate strait in the sector where WAG client is located, whereas a satellite 12-j with a large elevation angle $\alpha_j$ will indicate a wider strait in the sector where WAG client is located.

Upon selecting a first satellite 12-j to be searched, in step 620, WAG client 24 searches for the first satellite 12-j using the frequency $f_j(r)$ and code phase search range $R_j(sect)$ indicated in the search message for the first satellite 12-j. Once the first satellite 12-j has been detected, in step 630, WAG client 24 predicts a first area in which WAG client 24 may be located using information extracted from a GPS signal 11I j transmitted by the first satellite 12-j, as is well-known in the art. The first predicted area typically being a strait or small area within the sector where WAG client 24 is currently located. Such calculation is later used to narrow down the code phase search range $R_j$ of subsequent satellite searches.

In step 640, WAG client 24 uses the search message to pick a second satellite 12-j to search. WAG client 24 uses one or more criteria in a set of second satellite selection criteria to select the second satellite 12-j. In one embodiment, the set of second satellite selection criteria are as follows: (1) maximize utilization of correlators; (2) minimize search time; and (3) maximize the amount of additional information regarding location of WAG client 24 (or GPS receiver 14 or antenna 15) when used in conjunction with the results of the first search. The first and second criteria being identical to the first and second criteria of step 610. The third criteria involves selecting a second satellite 12-j that will result in an area which intersects/least, but nevertheless intersects, with the first predicted area. In one embodiment, the second satellite 12-j selected is a satellite 12-j that forms an angle of approximately 90° with the first satellite and WAG server 22 or WAG client 24, wherein WAG server 22 or WAG client 24 is the vertex. The angle between the fist and second satellites and WAG server 22 or client 24 can be determined using a difference between azimuth angles associated with the first and second satellites.

In step 645, WAG client 24 redefines or narrows down the code phase search range $R_j(sect)$ indicated in the search message for the second satellite 12-j based on the first predicted area. The redefined or narrowed down code phase search range $R_j(sect)$ is hereinafter referred to as a "predicted code phase search range $R_j(pred)$." The predicted code phase search range $R_j(pred)$ for the second satellite includes all possible phase shifts for GPS signals 11-j transmitted by the second satellite and arriving in the first predicted area. Since the first predicted area is a strait or small area within the sector where WAG client 24 is currently located, the corresponding predicted code phase search range $R_j(pred)$ will be narrower than the corresponding code phase search range $R_j(sect)$ originally indicated in the search message for the second satellite.

In step 650, WAG client 24 searches for the second satellite 12-j using the frequency $f_j(r)$ indicated in the search message and the predicted code phase search range $R_j(pred)$ for the second satellite 12-j. Once the second satellite 12-j has been detected in step 655, WAG client 24 predicts a second area in which WAG client 24 may be located using information extracted from a GPS signal 11-j transmitted by the second satellite 12-j. Like the first predicted area, the second predicted area is typically a strait or small area within the sector in which WAG client 24 is currently located.

The intersection of the first and second predicted areas effectively reduces the size of the search area in which WAG client 24 may be located. In step 660, WAG client 24 uses the intersected area and the code phase search range $R_j(sect)$ indicated in the search message to predict code phase search range $R_j(pred)$ for the remaining satellites 12-j indicated in the search message, thereby facilitating detection of the remaining satellites 12-j. Such predicted code phase search ranges $R_j(pred)$ include code phases for GPS signals 11-j transmitted by the remaining satellites indicated in the search message and arriving anywhere within the intersected area.

In step 670, WAG client 24 searches for the remaining satellites 12-j within the confines of the predicted code phase search ranges $R_j(pred)$ for the remaining satellites 12-j. In an embodiment of the present invention, WAG client 24 uses its correlators to perform parallel searches for two or more remaining satellites 12-j. Upon detecting the remaining satellites 12-j, in step 680, WAG client 24 calculates its location using the navigation data ND-j extracted from GPS signals 11-j transmitted by at least three satellites 11-j, as is well-known in the art.

The present invention is described herein with reference to certain embodiments, including an embodiment in which the first, second and all or some of the remaining satellites are searched sequentially. Other embodiments are possible. For example, the sequential search of the present invention may involve GPS receiver 28 searching in parallel for the fist and second satellites, and then searching in parallel for all or some of the remaining satellites. The present invention is also applicable to non-GPS satellite-based or non-satellite-based navigation system. Accordingly, the present invention should not be limited to the embodiments disclosed herein.

We claim:

1. A method for detecting a plurality of signals comprising the steps of:
   searching for a first signal using a first set of parameters;
   predicting a first area using information obtained upon detecting the first signal;
   searching for a second signal using a second set of parameters; and
   searching for other signals using a third set of parameters, the first predicted area and information obtained upon detecting the second signal.

2. The method of claim 1, wherein a plurality of correlators are used to sequentially searched for the first, second and other signals.

3. The method of claim 1, wherein the step of searching for the second signal includes using information obtained upon detecting the first signal.

4. The method of claim 1, wherein the first, second and other signals are associated with unique codes and the first, second and third sets of parameters indicate at least one frequency and a plurality of code phase search ranges at which to search for the first, second and other signals.

5. The method of claim 4, wherein the information obtained upon detecting the first and second signals is used to redefine one or more of the code phase search ranges indicated in the third set of parameters.

6. The method of claim 1, wherein the first, second and third sets of parameters are based on an initial position estimate.

7. The method of claim 1 comprising the additional step of:
   determining a position using the information obtained upon detecting the first and second signals and information obtained upon detecting the other signals.

8. A method for detecting satellite signals comprising the steps of:
   receiving with an antenna a search message indicating a plurality of satellites and sets of parameters, wherein the sets of parameters indicate at least one frequency and a plurality of code phase search ranges, elevation angles and azimuth angles for each of the plurality of satellites indicated in the search message;
   searching for a first signal transmitted by a first satellite indicated in the search message using a first set of parameters;
   searching for a second signal transmitted by a second satellite indicated in the search message using a second set of parameters;
   searching for other signals transmitted by other satellites indicated in the search message using a third set of parameters and information obtained upon detecting the first and second signals.

9. The method of claim 8, wherein the frequency indicated in the search message is based on an initial position estimate of the antenna.

10. The method of claim 8, wherein the plurality of code phase search ranges indicated in the search message include all possible phase shifts for the first, second and other signals arriving within a sector in which the antenna is currently located.

11. The method of claim 8, wherein the first satellite is a satellite with a small elevation angle relative to a majority of the elevation angles associated with the other satellites indicated in the search message.

12. The method of claim 8, wherein the second satellite is a satellite that an angle of approximately ninety degrees with the first satellite and the antenna.

13. A method for detecting satellite signals comprising the steps of:
   receiving with an antenna a search message indicating a plurality of satellites and sets of parameters;
   searching for a first signal transmitted by a first satellite indicated in the search message using a first set of parameters;
   predicting a first area in which the antenna is currently located using information obtained from the first signal;
   searching for a second signal transmitted by a second satellite indicated in the search message using a second set of parameters;
   searching for other signals transmitted by other satellites indicated in the search message using a third set of parameters and information obtained upon detecting the first and second signals.

14. The method of claim 13, comprising the additional step of:

redefining a code phase search range indicated in the search message for the second satellite using the first predicted area.

15. The method of claim 14, wherein the redefined code phase search range for the second satellite is used to search for the second signal.

16. The method of claim 15, wherein the second satellite is a satellite that provides information for predicting a second area in which the antenna is currently located that intersects least with the first area.

17. The method of claim 16 comprising the additional steps of:

predicting a second area in which the antenna is currently located using information obtained upon detecting the second signal.

18. The method of claim 17 comprising the additional step of:

redefining code phase search ranges indicated in the search message for at least one of the other satellites based on an intersection between the first and second areas.

19. The method of 18, wherein the at least one of the other satellites indicated in the search message is searched for using the redefined code phase search ranges.

20. A receiver comprising:

an antenna for receiving signals;

means for selecting a first satellite signal to search based on at least one criteria from a set of first satellite selection criteria;

means for selecting a second satellite signal to search based on at least one criteria from a set of second satellite selection criteria;

a plurality of correlators configured to sequentially search for the first satellite signal using a first set of parameters, the second satellite signal using a second set of parameters and other satellite signals using a third set of parameters and information obtained upon detecting the first and second satellite signals, wherein the first, second and third sets of parameters indicate at least one frequency and a plurality of code phase search ranges;

means for predicting a first area using the first satellite signal;

means for redefining a code phase search range indicated in the second set of parameters using the first predicted area.

21. A receiver comprising:

an antenna for receiving signals;

means for selecting a first satellite signal to search based on at least one criteria from a set of first satellite selection criteria;

means for predicting a first area based on information acquired upon detecting the first satellite signal;

means for selecting a second satellite signal to search based on at least one criteria from a set of second satellite selection criteria;

a plurality of correlators configured to sequentially search for the first satellite signal using a first set of parameters, the second satellite signal using a second set of parameters and other satellite signals using a third set of parameters and information obtained upon detecting the first and second satellite signals, wherein the first, second and third sets of parameters indicate at least one frequency and a plurality of code phase search ranges.

22. The receiver of claim 21 further comprising:

means for redefining a code phase search range indicated in the second set of parameters using the first area, wherein the plurality of correlators search for the second satellite signal using the redefined code phase search range indicated in the second set of parameters.

23. The receiver of claim 22 further comprising:

means for predicting a second area based on information acquired upon detecting the second satellite signal.

24. The receiver of claim 23 further comprising:

means for redefining code phase search ranges indicated in the third set of parameters using the first and second areas, wherein the plurality of correlators search for the other satellite signals using the redefined code phase search ranges indicated in the third set of parameters.

25. A receiver comprising:

an antenna for receiving signals;

means for selecting a first satellite signal to search based on at least one criteria from a set of first satellite selection criteria;

means for selecting a second satellite signal to search based on at least one criteria from a set of second satellite selection criteria;

a plurality of correlators configured to sequentially search for the first satellite signal using a first set of parameters, the second satellite signal using a second set of parameters and other satellite signals using a third set of parameters and information obtained upon detecting the first and second satellite signals, wherein the first, second and third sets of parameters indicate at least one frequency and a plurality of code phase search ranges;

means for predicting a first area using the first satellite signal and a second area using the second satellite signal;

means for redefining code phase search ranges indicated in the third set of parameters using the first and second predicted areas.

26. The receiver of claim 20, 21, or 25 wherein the first, second and third sets of parameters indicate at least one frequency and a plurality of code phase search ranges at which to search for the first, second and other satellite signals.

27. The receiver of claim 20, 21 or 25 further comprising:

means for replicating carrier signals having frequencies ranging from $f+\Delta f_{min}$ and $f+\Delta f_{max}$, wherein $\Delta f_{min}$ and $\Delta f_{max}$ are a minimum and maximum change in frequency the first, second and other satellite signals will undergo due to a Doppler effect.

28. The receiver of claim 20, 21 or 25 further comprising:

means for replicating codes associated with the first, second and other satellite signals.

* * * * *